UNITED STATES PATENT OFFICE.

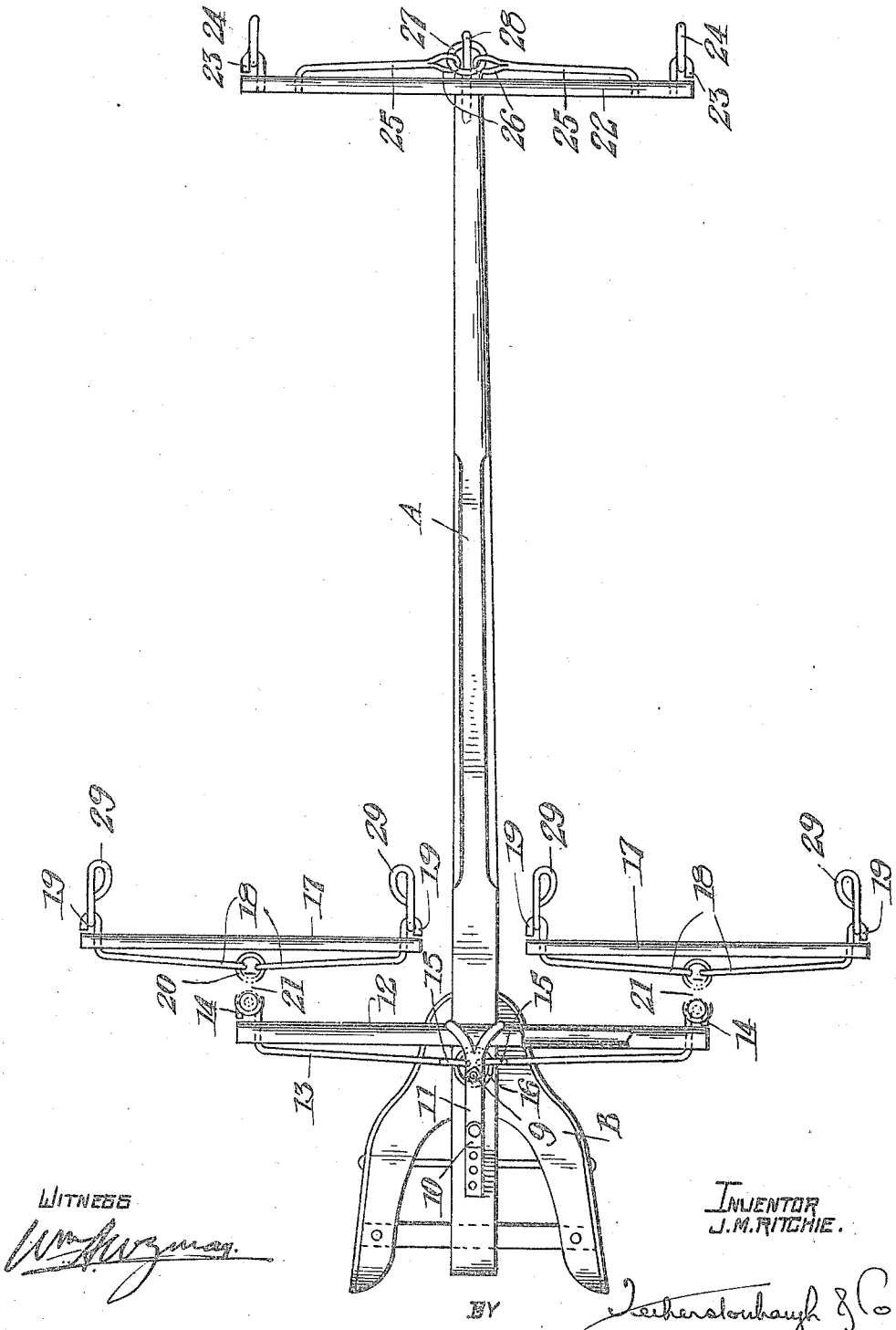

JOHN MILLER RITCHIE, OF WEMYSS, ONTARIO, CANADA.

TREE AND YOKE FOR WAGONS.

1,248,918.   Specification of Letters Patent.   Patented Dec. 4, 1917.

Application filed June 23, 1917. Serial No. 176,598.

*To all whom it may concern:*

Be it known that I, JOHN MILLER RITCHIE, a subject of the King of Great Britain, and resident of the village of Wemyss, in the Province of Ontario and Dominion of Canada, have invented certain new and useful Improvements in Trees and Yokes for Wagons, of which the following is a specification.

This invention relates to improvements in trees and yokes of that type usually forming part of a wagon equipment, and the objects of the invention are to render the trees and yokes more durable, to reduce the axial bending moment thereof, to permit of the said trees and yokes being readily utilized on wagons at present in use and generally to adapt the several parts to better perform the functions required of them.

With these and other objects in view, the invention consists essentially of the improved construction particularly described and set forth in the following specification and accompanying drawing forming part of the same.

In the drawing:

The figure represents a plan view of the improved trees and yoke as seen when mounted on a wagon pole.

Referring to the drawing, A represents a wagon pole operatively mounted on the hounds B and provided at the inner end with a bracket 10 carrying a forked draw strap or link 11, which is secured to the pole A by the draw bolt 9 while the forks engage the double tree 12 and steady the same.

This double tree consists of a tubular member through the ends of which the tensioning rods 13 pass, the outer ends of the rods being bent in hook shape as shown at 14, while the inner ends terminate in eyelets 15 adapted to engage with the ring 16 which is secured to the link or strap 11 by the draw bolt.

The whiffle trees 17 are similar to the double trees but are slightly smaller, each consisting of a tubular member with tensioning members 18 extending through the end thereof, and terminating in hook formation as shown at 19, the inner or adjacent ends of the tensioning members being secured to the rings 20 which are connected to the hook members 14 of the double tree by a link 21.

The neck yoke 22 consists of a tubular member through the ends of which hooks 23 extend, the said hooks being provided with rings 24 adapted to engage with the hames of the harness.

This neck yoke is also provided with tensioning members 25, the outer ends of which extend through the tubular members and are secured thereto, while the inner ends terminate in eyelets 26 engaging with the ring 27 which is secured to the pin 28 designed to be driven into the end of the pole A.

The assembly of the several parts will be readily understood from the foregoing description.

It will be readily appreciated that the neck yoke is provided with rings 24 attached to the ends thereof, the whiffle trees are provided with trace hooks 29 mounted on the hooks 19 of the tensioning member 18, the free ends of the hooks 29 being bent backwardly toward the eyelet of the same thereby preventing the traces from becoming inadvertently detached when they hang loose.

When a wagon is equipped with a neck yoke and trees of this description, the traces are attached to the hooks 29, while the hame straps pass through the rings 24, by providing each of the said trees and yoke with tubular members, the weight of each is greatly reduced, and since these tubular members are made of metal, the life time of the several parts is greatly increased, moreover, there is no liability of the several parts going out of repair, such as is common in wooden trees due to the shrinkage of the wood which results in the metallic mountings becoming disengaged.

As many changes could be made in the above description and many apparently widely different embodiments of my invention within the scope of the claim constructed without departing from the spirit or scope thereof, it is intended that all matter contained in the accompanying specification and drawing shall be interpreted as illustrative and not in a limiting sense.

What I claim as my invention is:

A draft member of the class described, comprising a tubular member, a tensioning member extending through the ends thereof, and terminating in open hooks bent outwardly and spaced from the tubular member, the inner ends of the tensioning member being formed in eyelets, a ring connecting the eyelets and draft connecting means connected to the hooks.

In witness whereof I have hereunto set my hand in the presence of two witnesses.

JOHN MILLER RITCHIE.

Witnesses:
JAMES MÜLLER MINGHEN,
SAMUEL THORNBURG.

Copies of this patent may be obtained for five cents each, by addressing the "Commissioner of Patents, Washington, D. C."